United States Patent [19]

Taylor et al.

[11] 4,312,424
[45] Jan. 26, 1982

[54] AUTOMATIC GREASE LUBRICATION SYSTEM FOR METERING AND DISPENSING LUBRICATION GREASE ONTO ROLLING-SLIDING, LINE CONTACT, BEARING SURFACE SURFACE

[75] Inventors: Harry M. Taylor; Terry L. Braaten, both of Centralia; Jack E. Stephens, Olympia; Donald C. Geraci, Centralia, all of Wash.

[73] Assignee: Washington Irrigation & Development Company, Spokane, Wash.

[21] Appl. No.: 58,506

[22] Filed: Jul. 18, 1979

[51] Int. Cl.³ ............... F01M 1/18; F01M 11/10
[52] U.S. Cl. .................... 184/6.4; 180/8 D
[58] Field of Search ............ 184/6, 6.4, 1 C, 7 R, 184/15 B; 180/8 R, 8 D

[56] References Cited

U.S. PATENT DOCUMENTS

| | | | |
|---|---|---|---|
| 2,230,759 | 2/1941 | Page | 180/8 D |
| 2,259,200 | 10/1941 | Cameron et al. | 180/8 D |
| 3,265,145 | 8/1966 | Beitzel | 180/8 D |
| 3,432,004 | 3/1969 | Lyth | 184/7 R |
| 3,678,631 | 7/1972 | Payne et al. | 184/6.4 X |
| 3,837,430 | 9/1974 | Decker et al. | 184/6.4 X |
| 3,901,341 | 8/1975 | Stoldt | 180/8 D |

Primary Examiner—David H. Brown
Attorney, Agent, or Firm—Wells, St. John & Roberts

[57] ABSTRACT

An automatic grease lubrication system is described for metering and dispensing lubrication grease onto rolling-sliding, line contact, bearing surface such as heavily loaded walking cams. The system includes an airless spray nozzle directed at the cam for spraying grease onto a portion of the cam surface in a desired spray pattern. A pneumatic driven pump conveys the grease to the spray nozzle at a high pressure of between 2000 and 3000 psi. The nozzle is activated in response to the rotation of the cam surface to spray the grease onto a selected portion of the cam surface.

10 Claims, 4 Drawing Figures

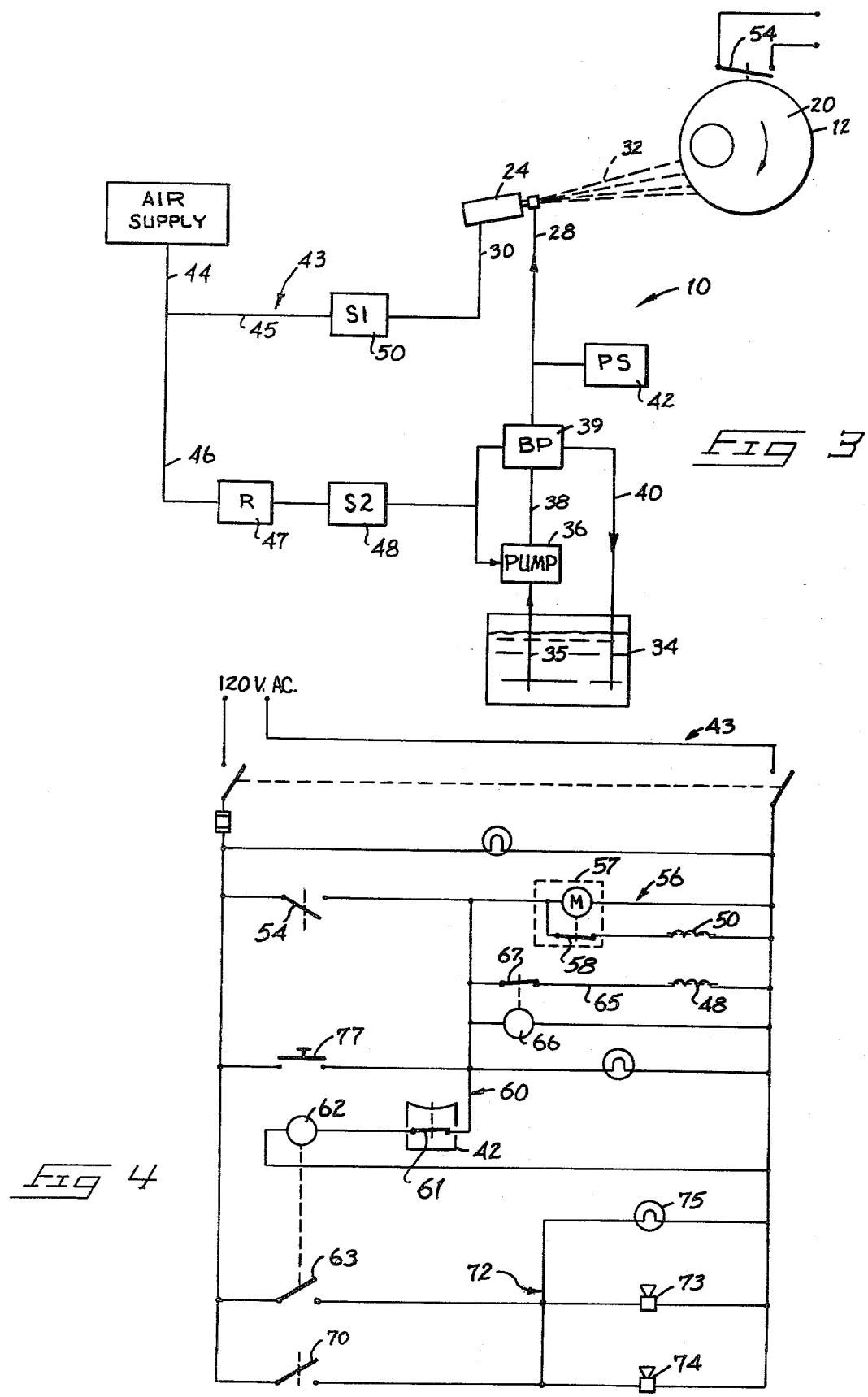

AUTOMATIC GREASE LUBRICATION SYSTEM FOR METERING AND DISPENSING LUBRICATION GREASE ONTO ROLLING-SLIDING, LINE CONTACT, BEARING SURFACE SURFACE

BACKGROUND OF THE INVENTION

This invention relates to automatic grease lubrication systems for metering and dispensing lubrication grease onto rolling-sliding, line contact bearing surfaces.

A perennial problem has been how to accurately and reliably apply grease to highly loaded rolling-sliding, line contact, bearing surfaces, particularly bearing surfaces in which the line contact pressure varies considerably during operation. The problem is particularly acute in large scale heavy-duty equipment such as mining walking draglines. Such draglines frequently utilize walking cams of substantial diameter that are in rolling-sliding, line contact with cam followers in which the line pressure on the cam varies considerably from one portion of the cam to another. In some applications the line contact can exceed 160,000 psi, particularly at the high lobe area.

Not only is it difficult to apply grease to the specific high lobe area accurately and reliably, but it is difficult to do so in small amounts to conserve grease. The grease is usually very expensive. In one application, a barrel of grease for walking cam costs in excess of $1500.

One of the principal objects of this invention is to provide an automatic grease lubrication apparatus for metering and dispensing small amounts of grease onto selected high pressure areas of the bearing surface in an accurate and reliable manner.

An additional object of this invention is to provide an automatic grease lubrication apparatus that is capable of accurately metering very expensive grease onto appropriate high pressure bearing surfaces so as to efficiently utilize the grease.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which:

FIG. 3 is a schematic block diagram of an automatic grease lubrication apparatus illustrating the grease and pneumatic lines; and FIG. 4 is an electrical schematic view of the electrical control systems for controlling the operation of the automatic grease lubrication apparatus.

DETAILED DESCRIPTION OF A PREFERRED EMBODIMENT

Figure 1:
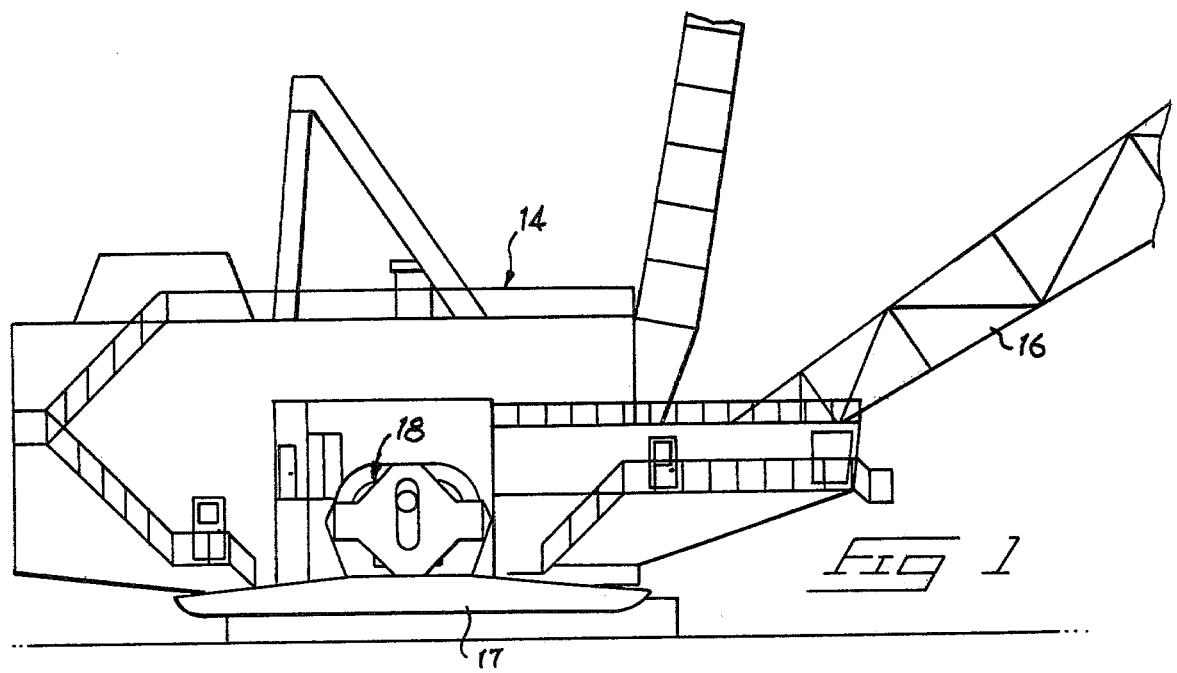
FIG. 1 is a schematic side view of a large walking dragline which has a walking cam with a rolling-sliding, line contact, bearing surface on the cam.
Figure 2:
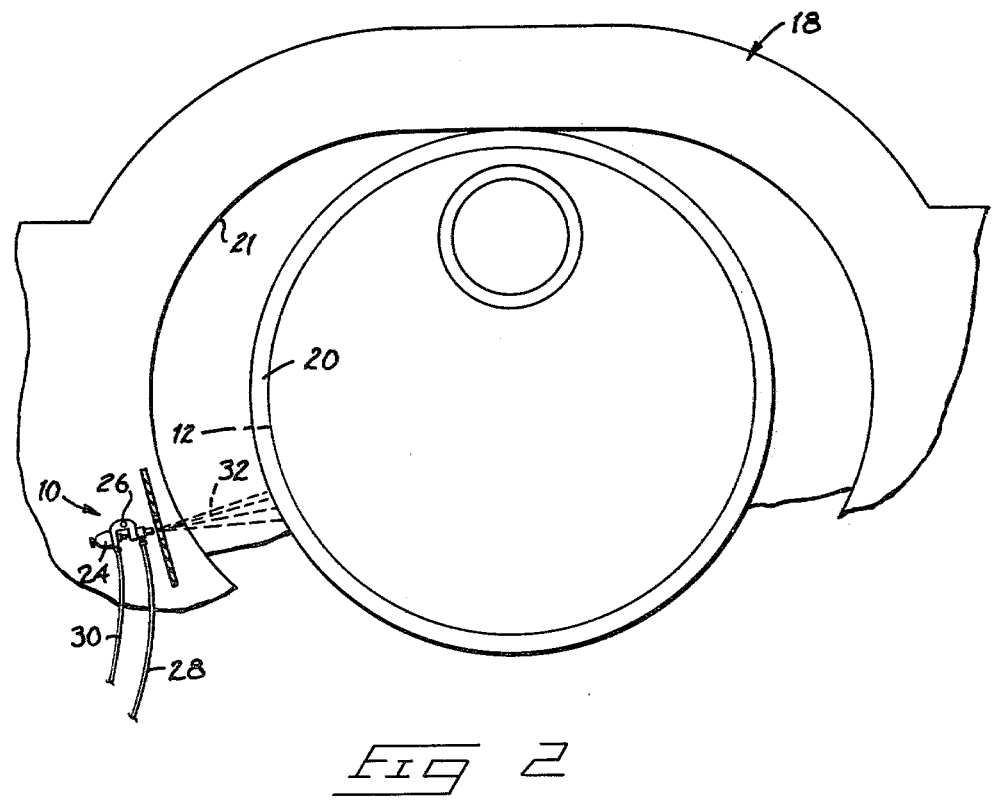
FIG. 2 is an enlarged fragmentary side view of the walking cam shown in FIG. 1.

Referring now in detail to the drawings, there is illustrated in FIGS. 3 and 4 an automatic grease lubrication apparatus 10 for metering and dispensing lubrication grease onto a rolling-sliding, line contact, bearing surface 12 such as that illustrated in FIG. 2.

In a preferred embodiment the automatic grease lubrication apparatus 10 is utilized in a walking dragline 14. The walking dragline 14 is an exceedingly large piece of equipment having a boom 16 of up to 300 feet in length. A bucket at the end of the boom frequently has a capability of moving between 55 and 60 yards of earth at one time.

The walking dragline 14 is moved utilizing walking shoes 17. The walking shoes 17 are articulated utilizing a walking cam assembly 18. The walking cam assembly 18 includes a walking cam 20 (FIG. 2) that is rotated about a transverse horizontal axis to raise and lower a rail or cam follower 21. The walking cam 20 has a peripheral rolling-sliding, line contact, bearing surface 12 in which the pressure along the bearing line may exceed 160,000 psi. The bearing surface may be referred to as being highly loaded, at least with respect to a portion of the cam surface. The maximum pressure is usually encountered at the high lobe of the walking cam 20. The loading on the cam will vary considerably between the high and low lobe portions.

It is extremely important to accurately and reliably apply lubrication grease to the high pressure portion of the bearing surface to prevent gauling and to enable the parts to slide with respect to each other.

The automatic grease lubrication apparatus 10 is specifically designed for discretely metering and dispensing grease onto the high loaded portion of a bearing surface in a rolling sliding, line contact environment.

The automatic grease lubrication apparatus 10 applies the grease in an atomized spray directly onto the high loaded portion of the bearing surface. The apparatus 10 utilizes a spray nozzle head 24 that is mounted to the walking cam assembly with the head 24 directed at the cam surface. The head 24 is mounted by a bracket 26 to secure the spray nozzle at the desired orientation. It has been found that the apparatus 10 can accurately direct atomized grease uniformly onto the cam surface at a distance in excess of three feet between the nozzle and the cam surface. The spray nozzle head 24 is of the airless type for directing atomized grease onto the cam surface. The apparatus includes a high pressure grease line 28 directed to the nozzle for supplying the grease to the nozzle head. A pneumatic control line 30 connected to the spray nozzle head 24 for automatically, selectively actuating the spray nozzle head 24, when the desired bearing surface opposes the nozzle head. The nozzle head 24 directs a spray pattern 32 of atomized grease uniformly onto the cam surface.

The automatic grease lubrication apparatus further includes a source of lubricating grease of a type that is specifically designed for high pressure rolling-sliding, line contact, lubrication. Such grease is very expensive and it is very important that the apparatus judiciously utilize the grease with only small amounts being directed to the high pressure surface so that the grease is not wasted. Frequently, the grease is supplied in barrels which may be utilized as the source 34 (FIG. 3). A supply line 35 extends from the source 34 to a pneumatic driven, positive displacement grease pump 36 that draws the grease from the source 34 and supplies the grease under pressure through grease line 28 to the spray nozzle head 24. The pump 36 is designed to supply the grease at pressures between 2000 and 3000 psi. The displacement pump has an output line 38 connected to the high pressure grease line 28. A bypass valve 39 is mounted in the output line 38 with a return grease line 40 from the bypass valve 39 back to the source 34. Additionally a pressure sensing means 42, such as a pressure switch, is operatively connected to the output line 38 for sensing the pressure of the grease as it is applied to the spray nozzle head 24. In a preferred embodiment the pressure switch is set at a pressure approximately 2500 psi.

The automatic grease lubrication apparatus 10 further includes operating means 43 for automatically operating the apparatus in response to the movement of the bearing surface 12 to accurately apply the grease to certain portions of the bearing surface. In the preferred embodiment the operating means is responsive to the rotation of the walking cam 20 to apply grease on the high lobe of the cam.

As illustrated in FIG. 3 the operating means 43 includes a low pressure (150 psi) pneumatic supply line 44 for supplying air to the system. The pneumatic supply line 44 communicates with a branch line 45 and a branch line 46. An air regulator 47 is mounted in the branch line 46 with a solenoid 48. The solenoid 48 controls the application of pneumatic pressure to the pump 36 and the bypass valve 39. When the solenoid 48 is actuated air is supplied to the pump 36 to drive the pump 36. When the solenoid 48 is deactivated air is discontinued to the pump 36 to discontinue the pump operation and to activate the bypass valve 39 to discharge the high pressure lubrication grease from the output line 39 through the return line 40 back to the source 34. A solenoid 50 is mounted in the branch line 45 for applying air to the spray nozzle 24. When the solenoid 50 is energized, air is applied through the branch line 45 to the spray nozzle head 24 to activate the spray nozzle to direct atomized high pressure grease onto the bearing surface 12.

The operating means 43 further includes a position sensing means 54 that is responsive to the angular position of the bearing surface 12. The sensing means 54 may be a microswitch that is operated directly or indirectly from the walking cam 20 to sense when the high pressure portion of the cam lobe is directly opposed to the spray nozzle head 24. In one application the position sensing means 54 is designed to operate over an angular movement of approximately 15° of the walking cam 20 adjacent the high portion of the cam lobe.

The operating means 43 further includes an electrical control circuit 56 for controlling the operation of the solenoid 50 to in turn energize the spray nozzle to direct the atomized grease onto the bearing surface 12. The electrical control circuit 56 includes a recyclable adjustable time delay relay 57 that is connected in series with the solenoid 50 for periodically energizing the solenoid 50 for adjustable pulse duration of time. In one embodiment, the relay 57 is designed to be energized for pulse durations of approximately 0.06 seconds during each 5 second interval in which the position sensing means 54 is activated. The relay 57 includes electrical contacts 58 for energizing the solenoid 50 for the pulse duration. The pulse duration of the solenoid 50 may be varied. The applicants have found that in one particular application, a 0.06 second duration causes approximately 1 ounce of atomized grease to be applied uniformly onto the bearing surface. Such amounts of grease can be varied depending upon the pulse duration time and the size of the orifice in the spray nozzle head 24.

The operating means 43 further includes an electrical control circuit 60 for warning the equipment operator when the pressure of the lubrication grease being applied to the nozzle head is below a selected minimum value. As previously mentioned in one application, the selected minimum value set by the pressure means 42 is approximately 2500 psi. The pressure sensing means 42 includes normally closed switch contacts 61 mounted in the electrical control circuit 60. The circuit 60 further includes a time delay relay 62 in series with the normally closed switch contacts 61. In one application, the time delay relay 62 is set to activate after three seconds. If the pressure in the output line 38 as sensed by the pressure sensing means 42 does not exceed the minimum pressure value, such as 2500 psi, the time delay relay 62 will close normally open contact 63.

The operating means 43 further includes electrical control circuit 65 for discontinuing the operation of the displacement pump 36 should the period of time for operation of the pump 36 exceed a selected value. Circuit 65 has a time delay relay 66 with normally closed contacts 67 that are mounted in a series with the solenoid 48. When the time delay relay 66 is energized contacts 67 open to de-energize solenoid 48 to discontinue application of the air to the pump. Additionally, the time delay relay 66, when activated, closes electrical contacts 70.

The operating means 43 further includes operator warning means 72 that is energized when either contact 63 or 70 are closed. The warning means 72 includes an operator warning device 73 that is mounted in the operator's cab and an audible warning device 74 that is mounted adjacent to the walking cam control panel. Additionally the warning means 72 includes a visual warning device 75 adjacent the control panel to indicate when there is a malfunction. The operating means 43 further includes a manual lube switch 77 that may be operated manually by an operator to test the effectiveness of the apparatus 10. Normally the manual lube switch 77 would not be utilized and would depend totally upon the automatic operation in response to the movement of the walking cam 20 as indicated by the position sensing means 54.

The operation of the automatic grease lubrication apparatus 10 will be described with respect to a preferred embodiment. When the selected portion of the bearing surface 12 moves to a position opposing the spray nozzle head 24, the position sensing means 54 will be activated to apply voltage to the recyclable adjustable time delay relay 57, the time delay relay 62, and the time delay relay 66. The adjustable time delay relay 57 is set to operate at a selected period of time greater than the time delay setting of relay 62. In a preferred embodiment, the adjustable time delay relay 57 is set to operate for a pulse duration of approximately 0.06 seconds every 5 seconds in which the position sensing means 54 is activated. The time delay relay 62 is set to energize after a 3 second interval. Additionally, the energization of the position sensing means 54 energizes the solenoid 48 to start the displacement pump 36 pumping high pressure grease to the spray nozzle 24. After a 5 second period of time the time delay relay 57 is energized to close the electrical contacts 58 to energize the solenoid 50 for the pulse duration to direct a pulse of atomized grease onto the selected portion of the bearing surface 12. At the conclusion of the pulse duration the adjustable time delay 57 opens the contacts 58 to terminate the application of grease to the cam. After a second 5 second interval has lapsed, the time delay relay 57 automatically closes electrical contacts 58 for a second duration period to direct a second burst of grease onto the bearing surface. The time delay relay 57 will automatically recycle every set interval as long as the position sensing means 54 is energized. In this manner small amounts of grease are placed on the high lobe of the cam surface at selected intervals. The line contact between the cam and the cam follower spreads the small amount of grease over the high pressure contact area.

The time delay relay 66 is normally set to be energized after a period of time has elapsed that corresponds to the normal period of time that the position sensing means 54 would be energized. In one application the relay 66 is set to actuate after fourteen seconds. Should the walking cam 20 stop on the high lobe, then the time delay 66 will run out causing the time delay relay 66 to be energized to open contacts 67 and thereby de-energize solenoid 48 to stop the operation of the pump 36. Likewise the time delay relay 62 would close contacts 70 causing the devices 73, 74 and 75 to be operated to warn the personnel operating the dragline.

In a preferred embodiment the time delay relay 62 would be set to operate after a 3 second period of time. Consequently, should the pressure in the output line 38 not exceed the minimum value, the time delay relay 62 would energize closing contact 63, thereby energizing the warning devices 73, 74 and 75 to warn the personnel that the pressure of the grease did not exceed the minimum value.

The lubrication cycle is automatically repeated during each revolution of the bearing surface to automatically apply small amounts of grease evenly in the spray pattern 32 onto the bearing surface 12.

Walking dragline 14 are extremely expensive pieces of equipment and frequently cost in excess of $10,000,000. The successful operation of the dragline is in part dependent upon the reliability of the automatic grease lubrication apparatus 10.

It should be understood that the above described embodiment is simply illustrative of the principals of this invention in describing the preferred embodiment. Alternatives may be readily devised by those skilled in the art without deviating therefrom. Therefore, only the following claims are intended to define or limit this invention.

We claim:

1. An automatic grease lubrication apparatus for metering and dispensing lubrication grease onto rolling-sliding, line contact, bearing surfaces that are rotated about an axis, comprising:
   a selectively operated airless spray nozzle directed at the bearing surface;
   a source of bearing grease;
   a high pressure pump means operatively interconnecting the source to the spray nozzle for pumping the grease from the source to the spray nozzle at a pressure greater than a desired minimum value; and
   operating means responsive to the rotation of the surface about the axis and the grease pressure being greater than the desired minimum value for selectively operating the spray nozzle for a selected duration at a selected angular position of the bearing surface to spray grease onto the selected portion of the bearing surface during each revolution of the surface about the axis.

2. The automatic grease lubrication apparatus as defined in claim 1 wherein the high pressure pump means comprises a positive displacement pump.

3. The automatic grease lubrication apparatus as defined in claim 1 wherein the high pressure pump means comprises a pneumatically driven, positive displacement pump for pumping the grease to the spray nozzle at a pressure above a desired minimum value of 2000 psi.

4. The automatic grease lubrication apparatus as defined in claim 1 wherein both the spray nozzle and the high pressure pump means are pneumatically operated.

5. The automatic grease lubrication apparatus as defined in claim 1 wherein the operating means includes:
   means for sensing the angular position of the cam surface with respect to the spray nozzle;
   adjustable duration means responsive to sensing means for operating the spray nozzle for an adjustable duration to spray selected amounts of grease onto the selected portion of the cam.

6. The automatic grease lubrication apparatus as defined in claim 5 wherein the operating means includes a pressure sensing means for preventing the operation of the spray nozzle unless the grease pressure to the spray nozzle is above the desired minimum value.

7. The automatic grease lubrication apparatus as defined in claim 1 wherein the operating means includes:
   position sensing means for sensing when the selected portion of the bearing surface is opposed to the spray nozzle and for generating a first electrical signal in response thereto;
   first control means responsive to the generation of the first electrical signal for activating the high pressure pump means;
   pressure sensing means for sensing when the pressure of the grease to the spray nozzle exceeds the desired minimum value and for generating a second electrical signal in response thereto; and
   second control means responsive to the generation of the second electrical signal for energizing a warning when the second electrical signal is not generated within a selected period of time after the first electrical signal is generated.

8. The automatic grease lubrication apparatus as defined in claim 7 further comprising warning means activated by the third control means for indicating that the high pressure pump means has been deactivated.

9. The automatic grease lubrication apparatus as defined in claim 7 wherein the operating means further includes a third control means responsive to the generation of the first electrical signal for deactivating the pump means when the time duration of the first electrical signal exceeds a second selected period of time.

10. The automatic grease lubrication apparatus as defined in claim 9 wherein the operating means further includes a fourth control means responsive to the generation of the first electrical signal for activating the spray nozzle for a third selected period of time to spray grease onto the selected portion of the bearing surface.

* * * * *